United States Patent [19]
Butler

[11] 3,920,116
[45] Nov. 18, 1975

[54] IMPELLER LOADING DEVICE

[75] Inventor: Stuart Butler, Willowdale, Canada

[73] Assignee: Technovators, Inc., Washington, D.C.

[22] Filed: Apr. 29, 1974

[21] Appl. No.: 464,987

[52] U.S. Cl. .................... 198/128; 302/37; 302/38
[51] Int. Cl.² ...................................... B65G 31/04
[58] Field of Search ............ 198/6, 128; 302/37, 38, 302/8; 241/275; 51/9

[56] References Cited
UNITED STATES PATENTS

| | | | |
|---|---|---|---|
| 799,287 | 9/1905 | Yackee | 198/6 |
| 1,596,261 | 8/1926 | Vaughn | 302/38 |
| 1,739,604 | 12/1929 | Monroe | 302/37 |
| 1,789,874 | 1/1931 | Lilly | 198/128 |
| 2,153,703 | 4/1939 | Ullman | 198/128 |
| 2,181,205 | 11/1939 | Rigor | 198/128 |
| 2,766,872 | 10/1956 | Pillsbury | 198/128 |
| 3,544,015 | 12/1970 | Gulic et al. | 241/275 |

Primary Examiner—Richard A. Schacher
Assistant Examiner—Jeffrey V. Nase
Attorney, Agent, or Firm—W. Charles Kent

[57] ABSTRACT

A bulk handling device for flaky, powdered or fine particulate materials comprising a dynamically balanced impeller having blades mounted on one side of an impeller disc, substantially perpendicularly thereto, said blades and disc adapted for rotation at high speeds. The blades extend generally radially inwardly from the periphery of the disc and are cut away towards the center thereof. The impeller is housed in an air-tight casing having a highly polished interior. The housing has a relatively large inlet to direct incoming material towards the blades and a smaller tangential outlet. A discharge pipe communicates with the outlet. When the impeller is rotated at high speeds, incoming material is accelerated and compacted with the expulsion therefrom of air, after which the material is ejected in compact form through the outlet and discharge pipe to relatively great distances. The impeller may be used in either a horizontal or vertical orientation. Where the device is used in horizontal orientation, a slight conical protrusion is centrally located on the same side of the impeller disc as the blades to direct incoming material towards the blades.

9 Claims, 6 Drawing Figures

IMPELLER LOADING DEVICE

BACKGROUND OF THE INVENTION

This invention relates to a mechanical device and method for handling bulk materials whereby flaky, powdered or fine particulate materials such as cereal or certain chemical products, can be loaded at high speed and capacity along a pipe into bulk handling vehicles such as trucks, railcars or ships, or into static containers. One version of this invention can be used as an in-plant vertical conveyor of bulk materials. The in-plant invention is particularly useful in the milling art for bulk moving of powdery or flaky materials such as bran, shorts, middlings and flour. In addition, the invention has application in the moving of powdered chemicals and agricultural products.

Until now, powders and flaky and particulate matter have been commonly moved or loaded in bulk by bucket elevators, pneumatic pipes, belt conveyors or screw conveyors. A modern screw conveyor system for bulk handling of flour is described in the September, 1960 issue of "American Miller & Processor" at pages 14 to 18. These devices for moving such materials in bulk suffer from the disadvantages that they create a serious dust problem at the handling site, and are inefficient and require much power in relation to the amount of material moved. It is estimated that such devices are capable of loading a maximum of one half ton of such material per horsepower per hour. In addition, for example, when such devices are used to load a box car or truck, they require additional manpower to level the loaded material and ensure that the materials get into the corners of the container.

Bulk movement of millfeeds was carried out, prior to about 1950, by means of "cup elevators". Pneumatic systems, whereby large fans evacuate air from systems of pipes and the millfeeds are drawn along in such pipes by the currents of air thus created, were developed in Switzerland and became very prominent in the 1950's and 1960's as a means for bulk movement of millfeeds within mills. Again the creation of dust is a serious problem with pneumatic systems. Mills using pneumatics require expensive and bulky dust filters to cut down "dust pollution". In addition, since air as well as the material in question must be moved by the fans, energy requirements are very substantial and efficiency is reduced. Moreover, since air is the transporting medium with pneumatic systems, moisture pick-up and bacteriological contamination of the product result.

It is also known in the prior art to move fine particulate matter such as powdered fuel or insulation in bulk by blowing such matter through fan structures or impellers. However, such devices are primarily as fans to blow air, the particulate material being transported in the air currents thus produced. As in pneumatic systems, such devices suffer from the disadvantages that dust is created in the handling area, and energy requirements are high and efficiency is low in these devices since large volumes of air must be moved along with the material in question.

It is similarly known to move grain using impellers without the assistance of air. Yackee in U.S. Pat. No. 799,287, dated Sept. 12, 1905, describes a car loader for grain consisting essentially of an impeller designed to be positioned within the grain car. Grain fed to the impeller is thrown tangentially from the impeller into the car. It is clear from the orientation of the blades and mechanical construction of the Yackee device that the impeller is intended to operate only at relatively low speeds to spread the grain about the car. The equipment is cumbersome to operate, requiring the impeller to be positioned within the car to be loaded, and does little to reduce the creation of dust.

U.S. Pat. No. 2,181,205 of G. L. Rigor, dated Nov. 28, 1939, describes a screw conveyor-fed impeller particularly designed for discharging powdered material in compact form. The powder which is swept through the impeller is compacted by way of centrifugal force. It is clear that Rigor's is not a bulk-handling device: the device in question operates to move small charges of material into bags fitted over the impeller discharge spout. Nor is the device constructed to operate at high speed, its speed being limited by its construction and function. For instance, Rigor's outlet spout, designed to permit the filling of bags immediately adjacent to the impeller, would restrict the outlet of materials from the impeller if the impeller were to operate at too great a speed.

SUMMARY OF THE INVENTION

In the bulk materials handling device according to the present invention, a source of flaky, powdered or fine particulate materials communicates directly with the blades of an enclosed, multi-bladed rotary impeller which rotates at high speeds, e.g., in the order of 1800 r.p.m. to 3600 r.p.m. The materials to be moved are accelerated to speeds in the order of 4500 to 10,000 feet per minute and ejected through a tangentially placed discharge pipe, or two diametrically opposite tangentially placed discharge pipes, directly into, for example, a vehicle to be loaded or a container. The vehicle or container is generally located at a distance from the impeller blades.

In view of the high speeds at which it operates, the impeller must be dynamically balanced. The impeller may be oriented in any position, although suitable modifications, some of which are referred to subsequently, may have to be made, for example, if the impeller is in horizontal or vertical orientation.

The impeller is made up of a number of blades positioned generally radially between the center and circumference of a rotor or impeller disc, and generally perpendicular thereto. The blades extend only part way towards the center of the impeller disc, thereby providing a relatively open central space in the impeller to receive the flaky or powdered material to be moved when the impeller is in horizontal orientation. A conical protrusion upwards from the plane of the disc may be provided to give incoming material to the horizontally oriented impeller an initial outward thrust and direct it towards the impeller blades. The height of the blades, proceeding outwardly, gradually diminishes throughout a greater part of the length of the blades.

The impeller is completely encased and may have a relatively large, centrally disposed materials inlet in the casing opposite the conical protrusion of the impeller disc, and a smaller tangentially disposed outlet in a peripheral portion of the impeller casing. A second, tangentially disposed outlet may be similarly located diametrically opposite this first outlet. A discharge pipe through which the discharged material is thrown is connected to the outlet or outlets.

As previously indicated, the impeller operates at a high speed, i.e., in the order of 1800 to 3600 r.p.m. and ejected material leaves the impeller at speeds in the order of 4500 to 10,000 feet per minute. The major vector component of resultant velocity of the material as it is ejected from the impeller is the tangential component provided by the movement of the tips of the impeller blades.

At these high operating speeds, the flaky, powdered or particulate material moved is greatly compacted as a result of the acceleration of the particles thereof from a virtually motionless state to about the velocity of the tip of the impeller blades. At the same time air entrained in the material in question is excluded producing a denser product.

Not only is a denser product ejected from the impeller into the vehicle or container to be loaded, there is also a substantial increase in the efficiency of this device over known prior art pneumatic devices and systems since the amount of air forced through the discharge pipe by the impeller blades is at a minimum. Also, in view of this fact, moisture loss and bacteriological contamination, problems which are prevalent with previously known pneumatic devices and systems, are greatly reduced.

Moreover, because of the simplicity of the impeller device of the present invention, serious maintenance problems and wearing out of internal parts, prevalent with, for example, previously known screw and belt conveyors, are greatly reduced. For example, in one experimental set-up of an impeller according to the present invention, 300,000 tons of millfeeds have been loaded with little or no wear to the "internals" and no serious mechanical maintenance problems.

In addition, the impeller according to the present invention has improved efficiency over known bulk handling devices in terms of energy required to move given weights of material, being able to move one ton per H.P. of electrical energy. The throughput in tons per hour is a function of blade speed, profile, impeller disc diameter and related power consumption, coupled with specific weight per cubic foot of the material being moved.

It is another important advantage of the present invention that the vehicle to be loaded or container to be filled can be a relatively long distance from the impeller.

A significant advantage of the present invention is the reduction of dust pollution in the air when handling materials in accordance with the invention. Dust is a problem inherent with pneumatic devices and other previously known bulk handling equipment where powdered or fine granular products are loaded into bulk vehicles. In many cases, with such known devices, secondary dust collectors must be set up in the loading area. No such secondary dust collectors are required when an impeller according to the present invention is used. In addition, the present invention permits the loading of a more concentrated and compacted product into a completely enclosed vehicle or container, these factors all contributing to a substantial reduction of dust in the atmosphere in the area to which the powdered or flaky material is being delivered. It can be seen that if, for example, a 3,000 cubic foot railcar, filled with air when empty, is filled with material according to the present invention, only about 3,000 cubic feet of air would be displaced into the neighborhood during the period of the loading operation (say 1 hour). Hardly any dust would move with that air because the air moves so slowly and does not have the energy to carry quantities of fine micron particles with it. An easily applied cloth filter may be fitted or draped over the door or entrance to the car, e.g., to reduce the effect of windage.

DESCRIPTION OF THE DRAWINGS

These and other advantages and features of the present invention will be subsequently described in association with drawings of a preferred embodiment in which.

DESCRIPTION OF THE PREFERRED EMBODIMENTS

Figure 1:
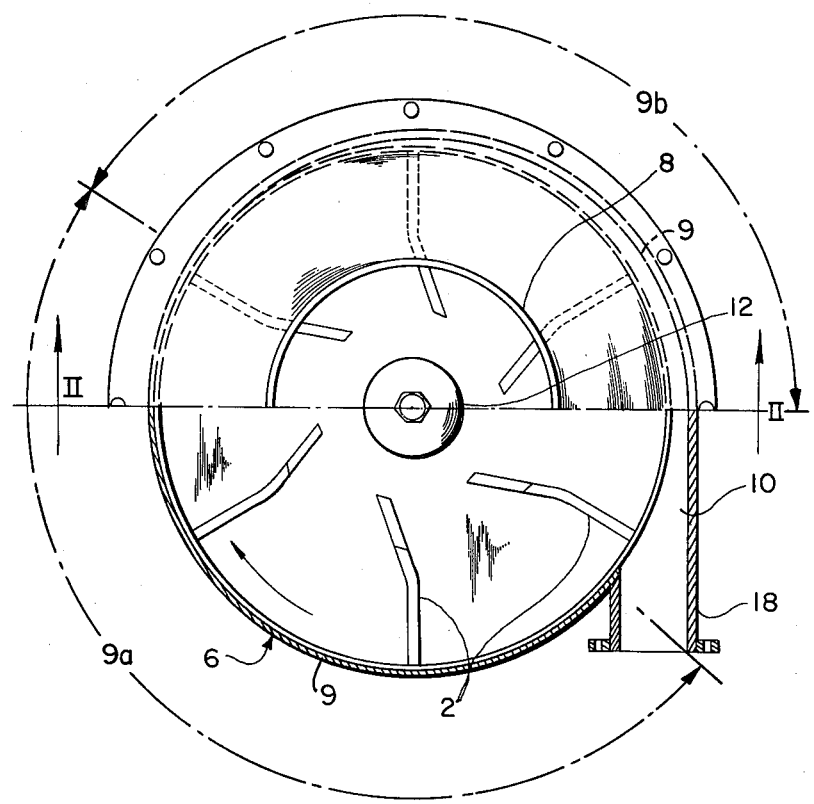
FIG. 1 is a plan view in partial section of an impeller according to the present invention.

In the following description of the illustrated embodiments, similar features have been given similar reference numerals.

Figure 2:
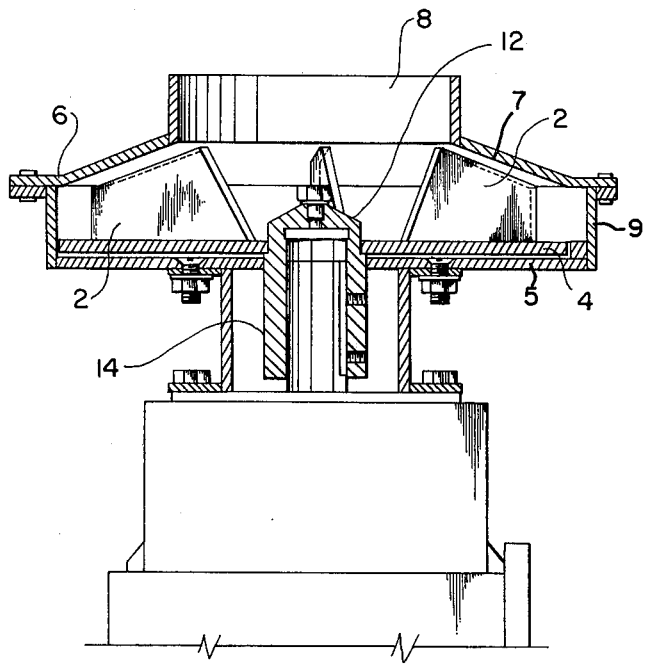
FIG. 2 is a cross-sectional view of the impeller illustrated in FIG. 1 along line II—II.

The impeller device illustrated in FIGS. 1 and 2 comprises six blades 2 positioned substantially radially at equal distances on impeller or rotor disc 4. The blades and rotor disc rotate within airtight housing 6 including, as illustrated in FIG. 2, a first planar sidewall 5 extending parallel to and closely adjacent the disc 4 and a second generally frusto-conical sidewall 7 extending closely adjacent the blades 2 and having central inlet 8. Connecting and extending between the first and second sidewalls 5, 7 is a circumferential wall 9 containing a tangential outlet 10. The circumferential wall 9 includes a first portion 9a extending a substantial circumferential distance around disc 4 at an evenly spaced distance from and closely adjacent to the periphery of the disc 4 and the radial extremities of the blades 2 as illustrated in FIG. 1. The remaining portion 9b of the circumferential wall is spaced a spirally, radially increasing distance from the circumference of the disc 4 terminating in the outlet 10. It is contemplated for most commercial applications of the present invention that the disc be 8 to 20 inches in diameter. The cross-sectional area of the discharge pipe described can be in the order of four square inches or more. This area may of course be altered depending upon the particular operating conditions.

Impeller blades 2 are cut away towards the central portion of the impeller disc, as can be seen best in FIG. 2. A conical protrusion 12, in this case formed by one end of impeller mount means 14, rises above the surface of impeller disc 4 at the central portion thereof opposite inlet 8.

The impeller blades are illustrated as being essentially perpendicular to the plane of the impeller disc and having the inner portions thereof angled slightly forwardly of the radial line upon which the outer portions thereof lie (i.e., in the direction of rotation of the disc). However, in other embodiments not shown, the inner portions of these blades are oriented generally radially on the face of the impeller disc, and the outer portions thereof are angled rearwardly of this radial line, i.e., opposite to the direction of rotation of the disc. In addition, the blades may have a generally concave height profile (depending on the particular use to which the impeller loading device will be put).

The motivating force applied to rotate the impeller can be, for example, a directly attached electrical motor, a hydraulic drive with vari-drive features, or a vari-drive belt chosen to suit the circumstances.

Figure 3:
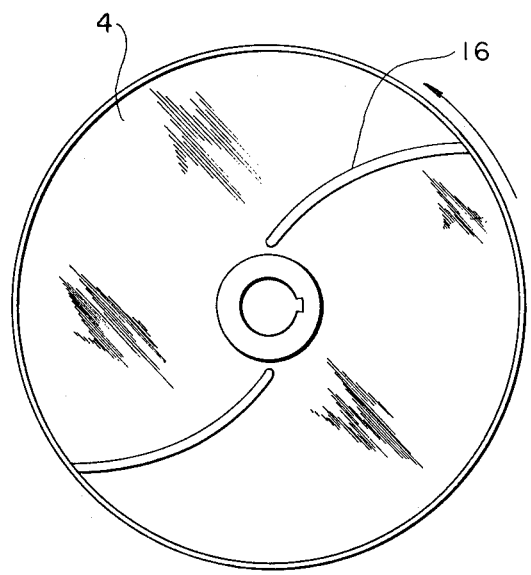
FIG. 3 is a bottom view of the rotor disc of the impeller of FIGS. 1 and 2 showing two angled purge strips.

In order to prevent build-up of very fine micron-sized dust particles between the underneath portion of the impeller disc and the corresponding inner surface of the housing, a pair of "dust purge" ribs 16, shown in FIG. 3, affixed to the underneath side of the impeller disc, may be used. The ribs cause a tiny amount of pressurized air to develop below the impeller disc and thus keep the area free from a build-up of dust. The resultant problems of heat buildup and wedging of the impeller disc are thereby avoided.

Figure 4:
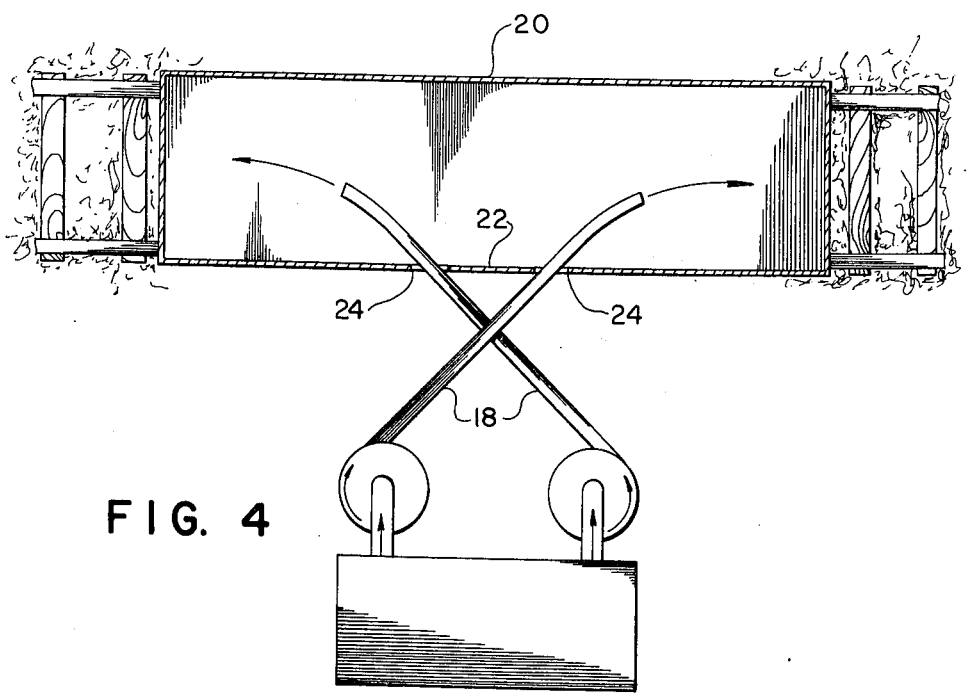
FIG. 4 is a plan view, partially schematic, of two impellers according to the present invention used to load a railway car.

Powdered or flaky material is freely permitted to enter the inlet portion of the impeller device by means of a hopper feeder or the like. The material is fed towards the quickly rotating blades by conical protrusion 12, or is immediately caught up by those blades and accelerated to extremely great speeds. For example, a 15 inch diameter impeller disc rotating at 1800 r.p.m. would have a tip speed of in excess of 7000 feet per minute. As a result of the acceleration of the material to approximately blade tip velocity prior to ejection from the impeller device, the material is compacted by the expulsion therefrom of much of the air entrained in the incoming material. A stream of compacted material, travelling at great velocity, is thus ejected through the discharge pipes 18 into railway car 20, shown in FIG. 4, or to any other bulk material receiver. Discharge pipes 18 enter car 20 through holes 24 in car door 22 in which holes the pipes fit relatively snugly. A properly constructed discharge pipe may be curved to direct the stream of material into the corners of the receiver. By using the "twin impellers" and crossing discharge pipes 18 as illustrated in FIG. 4, little if any curve is required in pipes 18 to fill most of the railway car. Of course, the use of two such impellers instead of one to fill a railway car streamlines the flow of material into the car by reducing the need for curvature of discharge pipes 18 (which would add to power requirements and increase wear). By directing the concentrated material ejected by the impeller device into a substantially closed container, little dust is created at the loading end, clearly an environmental advantage.

Figure 5:
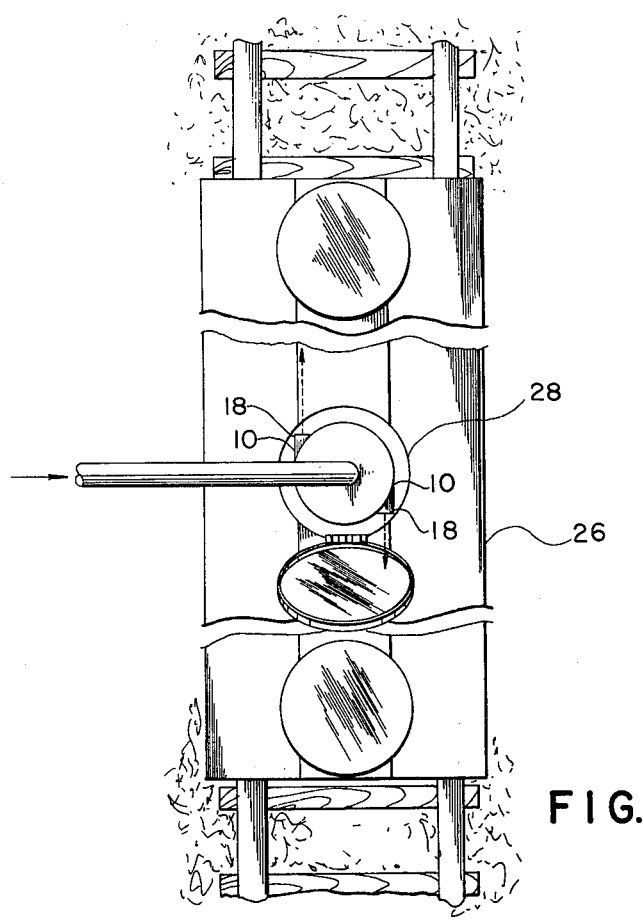
FIG. 5 is a top view illustrating the use of an impeller according to the present invention to fill a covered hopper railway car, (drawing not to scale)

FIG. 5 shows a covered hopper railway car 26 being loaded by an impeller according to the present invention having two diametrically opposite tangentially placed outlets 10 and discharge pipes 18. Any suitable known means for feeding material to the impeller and for placing it through and withdrawing it from hatch 28 can be used. Material passed through the impeller is ejected through discharge pipes 18 to the far corners of the car so that the car can be readily filled.

Figure 6:
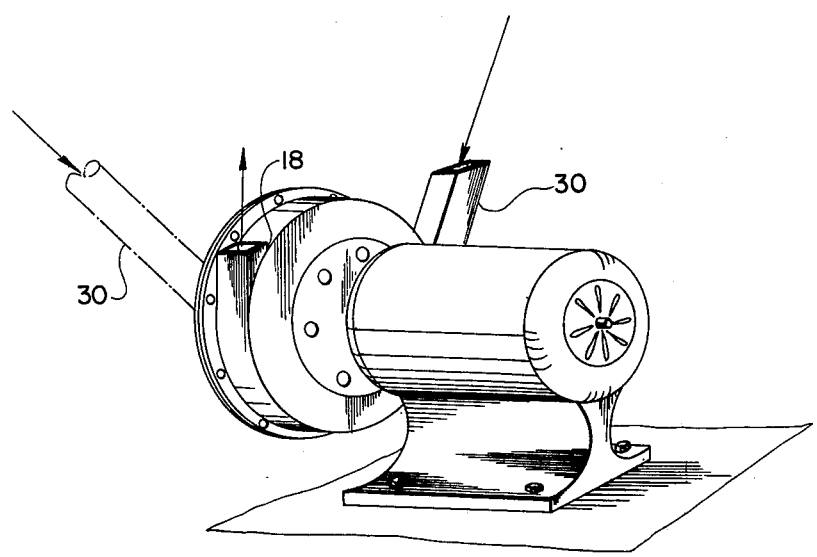
FIG. 6 is a perspective view of a small, in-plant impeller in vertical orientation.

In the "in-plant" embodiment of the present invention illustrated in FIG. 6, the impeller device is arranged vertically and used to throw powdered or flaky material in a vertical or horizontal direction. In the context of a modern day mill, having an average height of, for example, six stories, powdered and flaky materials are moved in bulk continuously upwards to the top floor by use of a multiple pneumatic system. As previously indicated, fans, generally all located for convenience on the top floor, suck air from the pipes through which the milled products are drawn, and such products must be drawn by the currents of air created to this top floor where they are separated from the air. Not only can the creation of dust (and consequent need for filters) and the inefficiency of such pneumatic systems in such mills be avoided by the use of a vertically oriented impeller, according to the present invention, such an impeller can be used to replace much of the machinery and pipes required by such pneumatic systems by permitting more localized handling of millfeeds — e.g., from one floor to the next one or two. Thus, substantial savings in power and efficiency can be achieved.

Such an in-plant device according to the present invention would be in the order of 8 to 14 inches in diameter and would rotate at a speed of in the order of 3600 r.p.m. At such speeds, such a device can be used to throw material vertically thirty or forty feet or more. In addition, this embodiment can be used in place of short distance lifts, for example, in a single story mill.

With such a vertically oriented in-plant device as illustrated in FIG. 6, where material is ejected in an upward direction, it is preferred that the material is fed through inlet pipe 30 into the side or edge of the machine and enters below the center horizontal line thereof. In this way gravity, instead of a central conical projection from the surface of the impeller disc, ensures that the material is fed directly to the impeller blades where it is accelerated. The profiles of the blades used on such an impeller are of course optional and may be altered to suit any given set of conditions.

It will be clear to one skilled in the art that appropriate modifications to the various features of the impeller device can be made in order to improve its performance and adapt it to particular operating conditions. High polish of all moving and stationary surfaces is desirable to reduce friction and wear and tear and to extend the life of the device and reduce power consumption. Fluorcarbon tapes, teflon or chrome may be used to cover or plate the blades and interior of the impeller housing. The number, depth and profile of the blades, as well as the shape thereof, can be altered. The disposition and shape of the inlet and outlet can be altered in order to obtain maximum efficiency of the device for a given material to be handled.

What I claim as my invention is:

1. Bulk handling apparatus for conveying flaky, powered or fine particulate materials in highly compacted form, comprising:
   A. impeller means for imparting linear momentum to the particulate material without entraining air therein, said impeller means including:
      1. a rotatable disc,
      2. a plurality of impeller blades mounted on one side of said rotatable disc, each said impeller blade extending generally radially inwardly from the periphery of said rotatable disc, each said impeller blade having a decreasing height toward the periphery of said rotatable disc,
   B. casing means surrounding and encompassing said impeller means for receiving particulate material and retaining said particulate material in substantial contact with said impeller blades for a period of time sufficient to allow compacting of the particulate material and to allow imparting of significant linear momentum thereto and for discharging said compacted particulate material at high linear speed, said casing means including:

1. a first sidewall extending parallel to and closely adjacent said rotatable disc,
2. a second sidewall extending closely adjacent said impeller blades opposite said rotatable disc, said second wall defining a generally frusto-conical surface and containing a centrally located inlet opening for receiving the particulate materials, and
3. a circumferential wall connecting and extending axially between said first and second sidewalls, said circumferential wall including
   a. a first portion extending a substantial circumferential distance around said rotatable disc at an evenly spaced distance from and closely adjacent to the periphery of said rotatable disc and the radial extremities of said blades, and
   b. a second portion extending the remaining circumferential distance around said rotatable disc, said second portion being spaced a spirally, radially increasing distance from the circumference of said rotatable disc terminating in a discharge opening, whereby the particulate material is compacted when impelled by said blades from the central portion to the peripheral portion of said casing means and said first portion of said circumferential wall retains the particulate material in contact with said impeller blades while the spiral shape of said second portion permits the particulate material to separate from said blades without entraining substantial air or losing substantial linear speed.

2. A bulk handling apparatus according to claim 1, wherein said impeller blades terminate short of the center of said disc, and said impeller disc has a slight conical protrusion centrally located on said one side of the disc for directing incoming material towards the blades, and wherein said inlet is facing said conical protrusion.

3. A bulk handling apparatus according to claim 1, further including means for rotating said disc at a speed in the range of 1800 to 3600 r.p.m.

4. A bulk handling apparatus according to claim 3 wherein said disc has a diameter of between 14 to 20 inches, and wherein said means for rotating said disc rotates said disc at about 1800 r.p.m.

5. A bulk handling apparatus according to claim 3, wherein the disc has a diameter of between 8 and 14 inches, and wherein the said means for rotating said disc rotates said disc at about 3600 r.p.m.

6. A bulk handling apparatus according to claim 1 wherein said impeller means includes six impeller blades.

7. A bulk handling apparatus according to claim 1, wherein the half of each said impeller blade nearest the center of said disc is curved slightly in the direction of rotation of the disc.

8. A bulk handling apparatus according to claim 1, wherein the half of each of said impeller blades nearest the periphery of said disc is curved slightly away from the direction of rotation of the disc.

9. A bulk handling apparatus according to claim 1, wherein said impeller means includes dust purge ribs on the side of said rotatable disc adjacent said first sidewall.

* * * * *